(12) United States Patent
Street

(10) Patent No.: US 9,504,266 B2
(45) Date of Patent: Nov. 29, 2016

(54) PHOTODEGRADABLE GUM BASE, A CHEWING GUM COMPRISING THE PHOTODEGRADABLE GUM BASE AND METHODS OF MAKING THE SAME

(71) Applicant: INTERCONTINENTAL GREAT BRANDS LLC, East Hanover, NJ (US)

(72) Inventor: Graham T. Street, Reading (GB)

(73) Assignee: INTERCONTINENTAL GREAT BRANDS LLC, East Hanover, NJ (US)

( * ) Notice: Subject to any disclaimer, the term of this patent is extended or adjusted under 35 U.S.C. 154(b) by 442 days.

(21) Appl. No.: 14/343,597

(22) PCT Filed: Sep. 19, 2012

(86) PCT No.: PCT/US2012/056003
§ 371 (c)(1),
(2) Date: Mar. 7, 2014

(87) PCT Pub. No.: WO2013/043653
PCT Pub. Date: Mar. 28, 2013

(65) Prior Publication Data
US 2014/0234477 A1   Aug. 21, 2014

Related U.S. Application Data

(60) Provisional application No. 61/537,734, filed on Sep. 22, 2011.

(51) Int. Cl.
*A23G 4/08* (2006.01)
*C08G 77/60* (2006.01)
*A23G 4/06* (2006.01)

(52) U.S. Cl.
CPC . *A23G 4/08* (2013.01); *A23G 4/06* (2013.01); *A23G 4/068* (2013.01); *C08G 77/60* (2013.01)

(58) Field of Classification Search
CPC .......... A23G 4/068; A23G 4/08; A23G 4/06; C08G 77/60
See application file for complete search history.

(56) References Cited

U.S. PATENT DOCUMENTS

| | | | |
|---|---|---|---|
| 3,249,580 A * | 5/1966 | Beck .............. | C08G 77/42 524/500 |
| 4,279,931 A | 7/1981 | Verwaerde et al. | |
| 4,518,615 A | 5/1985 | Cherukuri et al. | |
| 4,619,834 A | 10/1986 | Zanno et al. | |
| 5,227,154 A | 7/1993 | Reynolds | |
| 5,378,131 A | 1/1995 | Greenberg | |
| 5,672,367 A | 9/1997 | Grijpma et al. | |
| 5,679,397 A | 10/1997 | Kuroda et al. | |
| 5,882,702 A | 3/1999 | Abdel-Malik et al. | |
| 6,004,445 A | 12/1999 | Genders et al. | |
| 6,685,916 B1 | 2/2004 | Holme et al. | |
| 7,923,577 B2 | 4/2011 | Bardsley et al. | |
| 2008/0057155 A1 | 3/2008 | Luo et al. | |
| 2010/0074987 A1 | 3/2010 | Neergaard | |
| 2010/0209359 A1 | 8/2010 | Foster et al. | |
| 2010/0215799 A1 | 8/2010 | Cosgrove et al. | |
| 2010/0233314 A1 | 9/2010 | Cosgrove et al. | |
| 2011/0070171 A1 | 3/2011 | Kazimierski et al. | |
| 2011/0070329 A1 | 3/2011 | Kazimierski et al. | |
| 2011/0091531 A1 | 4/2011 | Furrer et al. | |

FOREIGN PATENT DOCUMENTS

| | | | |
|---|---|---|---|
| CN | 102160592 | | 8/2011 |
| JP | 09255785 A | * | 9/1997 |
| JP | 2005078001 | | 3/2005 |
| JP | 2005314712 | | 11/2005 |
| WO | 2007061888 A2 | | 5/2007 |
| WO | 2008002337 A2 | | 1/2008 |
| WO | 2008103816 A1 | | 8/2008 |
| WO | 2010125342 A2 | | 11/2010 |

OTHER PUBLICATIONS

Utracki, L.A., Ajji, A., Dumoulin, M.M. 1999. "Alloys and Blends." Concise Polymeric Materials Encyclopedia. CRC Press. pp. 38-40.*
China Office Action for Chinese Patent Application No. 201280046235.3, OA transmission date Dec. 15, 2014, 4 pages, English Translation.
China Office Action for Chinese Patent Application No. 201280046235.3, OA Transmission date Dec. 15, 2014, 4 pages, non-English translation.
Japan Office Action for Japanese Patent Application No. 2014-531915, OA transmission date Jan. 27, 2015, 2 pages, English Translation.
Japan Office Action for Japanese Patent Application No. 2014-531915, OA transmission date Jan. 27, 2015, 2 pages, non-English Translation.

(Continued)

*Primary Examiner* — Nikki H Dees
(74) *Attorney, Agent, or Firm* — Cantor Colburn LLP

(57) ABSTRACT

A photo-degradable chewing gum base composition including an elastomer; and a block copolymer of vinyl acetate and methylphenylsilane having a structure of formula (I)—

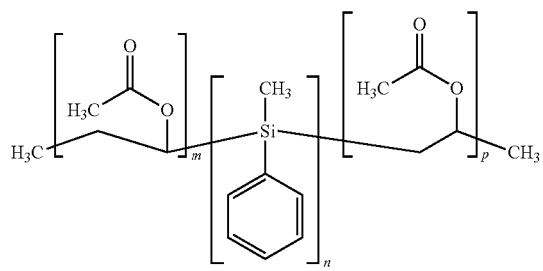

wherein m and p are integers in the range of 1 to 500, and n is an integer in the range of 2 to 100, is disclosed. The block copolymer facilitates environmental degradation of improperly disposed chewing gum cuds. Also described is a method of preparing a photo-degradable chewing gum composition.

12 Claims, 1 Drawing Sheet

(56) References Cited

OTHER PUBLICATIONS

Chen et al.; "Photopolymerization of Styrene, p-Chlorostyrene, Methyl Methacrylate, and Butyl Methacrylate with Polymethylphenylsilane as Photoinitiator"; Journal of Polymer Science, Part A: Polymer Chemistry; 34; pp. 679-685; (1996).

Matsuura et al.; "Synthesis of Polysilane-Acrylamide Copolymers by Photopolymerization and Their Application to Polysilane—Silica Hybrid Thin Films"; Polymer; 43; pp. 1549-1553; (2002).

International Search Report and Written Opinion; International Publication No. PCT/US2012/065003; International Filing Date Sep. 19, 2012; Date of Mailing Dec. 3, 2012; 10 pages.

Peinado et al.; "Free Radical PhotopolymerizationInitiated by Polysilanes. Scrutiny of the Initiation Efficiency"; Macromol. Chem. Phys.; 201; pp. 1156-1160; (2000).

Yucesan et al.; "Synthesis of Block Copolymers by Using Polysilanes"; Die Angewandte Makromolekulare Chemie; 22; pp. 207-216; (1994).

Matyjaszewski et al.; "Synthesis of Block, Graft and Star Polymers from Inorganic Macroinitiators"; Applied Organometallic Chemistry; 12; pp. 667-673; (1998).

\* cited by examiner

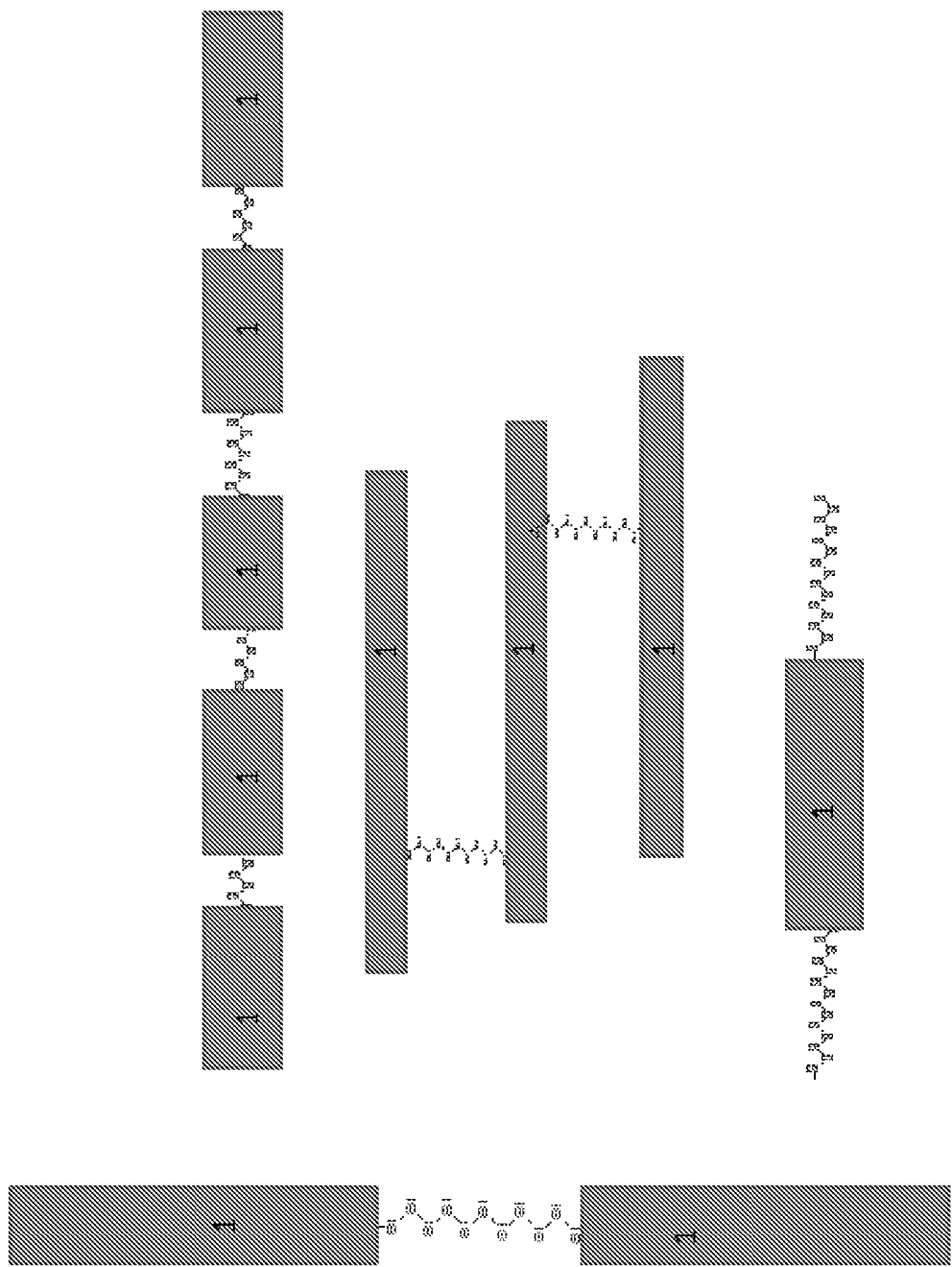

PHOTODEGRADABLE GUM BASE, A CHEWING GUM COMPRISING THE PHOTODEGRADABLE GUM BASE AND METHODS OF MAKING THE SAME

CROSS REFERENCE TO RELATED APPLICATIONS

This is a U.S. national stage of application No. PCT/US2012/056003, filed on Sep. 19, 2012. Priority under 35 U.S.C. §119(a) and 35 U.S.C. §365(b) is claimed from U.S. Provisional Application No. 61/537,734 filed on Sep. 22, 2011, the disclosure of which is also incorporated herein by reference.

BACKGROUND OF THE INVENTION

Chewing gums generally contain a water-insoluble gum base, as well as sweeteners, natural or artificial flavors, and a variety of additives tailored to provide specific sensory and physical characteristics. The water-insoluble gum base provides the desired chewy and tacky properties to the chewing gum.

Improperly disposed chewing gum cuds can adhere to the ground and other surfaces, where they are typically resistant to environmental degradation. Such gum litter is a nuisance, and its removal can be difficult and expensive.

When a chewing gum is being chewed, it is desirable that the gum maintains its viscoelastic nature. However, the stickiness and elastic properties become undesirable when the chewed gum is discarded. Some researchers have attributed the sticky properties of the chewing gum to the solvent used for dissolving elastomers while making the gum base and proposed excluding the solvent from gum base. For example, U.S. Pat. No. 5,882,702 to Abdel-Malik et al. obviates the need for elastomer solvents by replacing elastomers with a plasticized proteinaceous material such as zein. The incorporation of a plasticized proteinaceous material in chewing gum products, however, often compromises taste and thus can be undesirable from a consumer acceptability standpoint.

Furthermore, gum products that do not stick to teeth or oral prosthetics have been reported in U.S. Pat. No. 4,518,615 to Cherukuri et al. However, these gum products still do not solve the problem of discarded chewing gum cuds, which remain sticky enough to adhere to environmental surfaces and slow to degrade.

There is a need, therefore, for chewing gum compositions that degrade when exposed to environmental factors including sunlight, heat and other physical factors. Also, any solution proposed to address the above problem should not adversely affect the taste, chewy nature, or release profile of the chewing gum compositions.

BRIEF DESCRIPTION OF THE INVENTION

One embodiment is a photo-degradable gum base composition comprising: an elastomer; and a block copolymer of vinyl acetate and methylphenylsilane having a structure of Formula (I)—

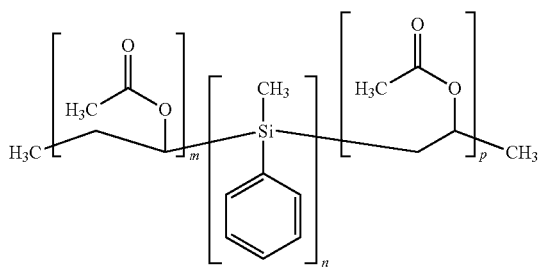

wherein m and p are integers in the range of 1 to 500, and n is an integer in the range of 2 to 100.

Another embodiment is a photo-degradable chewing gum composition comprising an elastomer; a block copolymer having a structure of formula (I) above, wherein m and p are integers in the range of 1 to 500, and n is an integer in the range of 2 to 100; and at least one sweetener.

Yet another embodiment is a method of preparing a degradable chewing gum comprising: blending an elastomer; a block copolymer of vinyl acetate and methylphenyl silane having a structure of formula (I) above, wherein m and p are integers in the range of 1 to 500, and n is an integer in the range of 2 to 100; and at least one sweetener.

BRIEF DESCRIPTION OF THE DRAWING

FIG. 1 shows various structural forms of block copolymers of vinyl acetate and methylphenylsilane.

DETAILED DESCRIPTION OF THE INVENTION

In some embodiments, there is provided a photo-degradable gum base composition comprising an elastomer; and a block copolymer of vinyl acetate and methylphenylsilane having a structure of formula (I) above, wherein m and p are integers in the range of 1 to 500, and n is an integer in the range of 2 to 100.

As used herein, the term "block copolymer of vinyl acetate and methylphenylsilane" refers to a multi-block copolymer comprising at least two blocks of polyvinyl acetate and at least one mid-block of polymethylphenylsilane. The block copolymer essentially contains at least one unit having the structure of formula (I) above, wherein m and p are integers in the range of 1 to 500, and n is an integer in the range of 2 to 100. Within the range of 1 to 500, m and p can be about 20 to about 400, specifically about 50 to about 300 and more specifically about 60 to about 250. Within the range of about 2 to about 100, n can be about 5 to about 80, specifically about 10 to about 70 and more specifically about 15 to about 75.

In the block copolymer, each block of polymethylphenylsilane is covalently bonded to at least one vinyl acetate monomer on both ends of the polymer chain. It will be understood that the block copolymer can be a linear copolymer or a branched copolymer.

It has been surprisingly found that addition of block copolymer of vinyl acetate and methylphenylsilane provides photo-degradation properties to the gum base. It was surprisingly found that a gum base comprising about 5 to about 30 weight percent by weight of the block copolymer is significantly more susceptible to photo-degradation as compared to a gum base lacking such block copolymer. Without bound by a theory, it is believed that the silane (—Si—Si—) bond in the block copolymer absorbs UV component of sunlight and breaks down, thereby causing degradation of the gum base. With regards to the visco-elastic properties, the gum base containing the block copolymer has comparable visco-elastic properties to those of a gum base containing a polyvinyl acetate polymer in the same amount as the block copolymer. Further, addition of the block copolymer to the gum base does not adversely affect taste, texture, chewy nature and other desirable properties of a chewing gum made using the gum base.

The gum base contains a suitable amount of the block copolymer of vinyl acetate and methylphenylsilane so as to provide photo-degradation properties to the gum base. In some embodiments, the gum base contains about 5 to about 30 weight percent of the block copolymer, based on the total weight of the gum base. Within the range of about 5 to about 30 weight percent, the block copolymer can be about 10 to about 25 weight percent, specifically about 15 to about 20 weight percent. The block copolymer when present below about 5 weight percent, it provided very little photo-degradation properties. Also, when the block copolymer is present in amounts above 30 weight percent, it adversely affects taste, texture and other desirable properties of the gum base and a chewing gum made therefrom.

The block copolymer contains suitable amount of methylphenylsilane so as to provide desirable level of photo-degradation properties to the gum base. In some embodiments, the block copolymer contains about 0.1 to about 10 percent by weight of the methylphenylsilane, based on the weight of the block copolymer as measured according to proton nuclear magnetic resonance spectroscopy. Within the range of about 0.1 to about 10 percent, the methylphenylsilane can be about 0.5 to 8 weight percent, specifically about 1 to about 5 weight percent.

The block copolymer can have a weight average molecular weight of about 50,000 to about 200,000 atomic mass units. Within the range of about 50,000 to about 200,000, the molecular weight can be about 60,000 to about 150,000, specifically about 75,000 to about 125,000.

In some embodiments, the photodegradable gum base further comprises at least one additional component, which promotes photo-degradation. Suitable additional components include chlorophyll, and derivatives of chlorophyll such as chlorophyllin, pheophytin, pyropheophytin and pheophorbide. The at least one additional component can be present in an amount of about 0.1 to 10 weight percent based on the weight of the gum base. Within the range of about 0.1 to about 10 percent, the additional component can be about 0.5 to about 8 weight percent, specifically about 1 to about 5 weight percent.

In some embodiments, the photodegradable gum base further comprises at least one water absorption-promoting component, which promotes water absorption properties of the gum base after mastication. Suitable water absorption promoting components include a copolymer of methyl vinyl ether and maleic anhydride; an ether or ester of copolymer of methyl vinyl ether and maleic anhydride; a terpolymer of methylvinyl ether, maleic anhydride and maleic acid; a copolymer of polystyrene and maleic anhydride; a polysuccinimide; an alternating copolymer of ethylene and maleic anhydride, and combinations thereof. Suitable water absorption-promoting components are further described in PCT publications WO2007/061888A1, WO2008002337A1, WO2008103816 of Soper et al, and WO 2010/125342 A2 of Harris et al. The at least one water absorption-promoting component can be present in an amount of about 0.1 to about 15 weight percent based on the weight of the gum base. Within the range of about 0.1 to about 15 weight percent, the at least one water absorption-promoting component can be about 1 to about 10 weight percent, specifically about 4 to about 8 weight percent.

In some embodiments, the gum base further comprises at least one hydrolysis-promoting component. Suitable hydrolysis-promoting components include talc, calcium carbonate, carbonate-containing fillers, dicalcium phosphate and combinations thereof. The at least one hydrolysis promoting component can be present in an amount of about 5 to about 35 weight percent based on the weight of the gum base. Within the range of about 5 to about 35 weight percent, the at least one hydrolysis promoting component can be about 10 to about 30 weight percent, specifically about 15 to about 25 weight percent.

In some embodiments, the gum base further comprises at least one non-stick inducing component. Suitable non-stick inducing components include hydrogenated cottonseed oil, hydrogenated soybean oil, hydrogenated canola oil, hydrogenated olive oil, hydrogenated grape seed oil, hydrogenated peanut oil, hydrogenated sunflower oil, hydrogenated safflower oil, hydrogenated palm oil, hydrogenated cocoa butter, hydrogenated coconut oil, hydrogenated palm kernel oil, animal fats, fatty esters of sugars and phospholipids. The gum base exhibits increased degradability and/or reduced-stick properties in the presence of the non-stick inducing component as compared to in the absence of the non-stick inducing component. The non-stick inducing component can be present in an amount of about 5 to about 40 weight percent based on the weight of the gum base. Within the range of about 5 to about 40 weight percent, the at least one hydrolysis promoting component can be about 10 to about 35 weight percent, specifically about 15 to about 30 weight percent.

Addition of the block copolymer of formula I, additional photo-degradation promoting components, water absorption promoting components, hydrolysis promoting components and non-stick inducing components to a gum base makes it susceptible to a number of environmental conditions. Such gum base is more likely to degrade when exposed to sun light, rain, foot fall, sweeping or other environmental factors. Since such gum base is susceptible to degradation in any weather, it can be called an all-weather degradable gum base.

Besides the above described block copolymer and other components, the gum base can also include any number of suitable additional polymers useful as elastomers. Illustrative examples of suitable additional elastomers in gum bases include both natural and synthetic elastomers and rubbers, for example, substances of vegetable origin such as chicle, crown gum, nispero, rosadinha, jelutong, perillo, niger gutta, tunu, balata, gutta-percha, lechi-capsi, sorva, gutta kay, and the like, and combinations thereof. Synthetic elastomers include high- and low-molecular weight elastomers. Useful high molecular weight elastomers include butadiene-styrene copolymers, polyisoprene, polyisobutylene, isobutylene-isoprene copolymers, polyethylene, combinations thereof, and the like. Useful low-molecular weight elastomers include polybutene, polybutadiene, polyisobutylene, and combinations thereof. Suitable gum bases can also include vinyl polymeric elastomers such as poly(vinyl acetate) (PVA), polyethylene, vinyl copolymeric elastomers such as copolymers of vinyl acetate and vinyl laurate, copolymers of vinyl acetate and vinyl stearate, copolymers of ethylene and vinyl acetate, poly(vinyl alcohol) and combinations thereof. When utilized, the weight average molecular weight of the vinyl polymers can range from about 3,000 to about 94,000 atomic mass units. Vinyl polymers such as poly(vinyl alcohol) and poly(vinyl acetate) can have a weight average molecular weight of about 8,000 to about 65,000 atomic mass units. Furthermore, any combination of the aforementioned high- and low-molecular weight, natural and synthetic elastomers, and rubbers can be used as a gum base. The elastomers can be present in an amount of about 35 to about 95 weight percent, based on the weight of the gum base. In some embodiments, the gum base includes an elastomer selected from the group consisting of polyisobutylene, butyl rubber, butadiene-styrene rubber and combinations thereof.

The gum base composition can also contain conventional elastomer plasticizers and softeners to aid in softening the elastomer component. For example, plasticizers may include terpene resins such as polymers derived from alpha-pinene, beta-pinene, and/or d-limonene; methyl, glycerol or pentaerythritol esters of rosins or modified rosins and gums, such as hydrogenated, dimerized or polymerized rosins, or combinations comprising at least one of the foregoing resins; the pentaerythritol ester of partially hydrogenated wood or gum rosin; the pentaerythritol ester of wood or gum rosin; the glycerol ester of wood rosin; the glycerol ester of partially dimerized wood or gum rosin; the glycerol ester of polymerized wood or gum rosin; the glycerol ester of tall oil rosin; the glycerol ester of wood or gum rosin; the partially hydrogenated wood or gum rosin; the partially hydrogenated methyl ester of wood or rosin; and the like. Any combination of the foregoing elastomer plasticizers can be used to soften or adjust the tackiness of the elastomer base component. The elastomer plasticizer can be used in amounts of about 5 to about 75 weight percent of the gum base, specifically about 45 to about 70 weight percent of the gum base.

In some embodiments, the gum base composition further contains an elastomer softener. In some embodiments, the softener is present in amounts of up to about 30 weight percent of the gum base, specifically about 3 to about 20 weight percent of the gum base. Suitable softeners include lanolin, palmitic acid, oleic acid, stearic acid, fatty acids, sodium stearate, potassium stearate, glyceryl triacetate, glyceryl lecithin, glyceryl monostearate, propylene glycol monostearate, mono-, di- and triglycerides, acetylated monoglyceride, glycerine, lecithin, diacetin, and combinations thereof. Other suitable softeners include waxes. Waxes, for example, natural and synthetic waxes, hydrogenated vegetable oils, petroleum waxes such as polyurethane waxes, polyethylene waxes, paraffin waxes, microcrystalline waxes, fatty waxes, sorbitan monostearate, tallow, cocoa butter, propylene glycol, and the like can also be incorporated into the gum base to obtain a variety of desirable textures and consistency properties. The waxes employed can have a melting point below about 60 degrees Celsius, and specifically about 45 to about 55 degrees Celsius. The low melting wax can be a paraffin wax. The wax can be present in the gum base in an amount about 6 to about 10 weight percent, and specifically about 7 to about 9.5 weight percent, based on the total weight of the gum base. In addition to the low melting point waxes, waxes having a higher melting point can be used in the gum base in amounts up to about 5 weight percent based on the weight of the gum base. Such high melting waxes include beeswax, vegetable wax, rice bran wax, candelilla wax, carnauba wax, polyethylene wax, microcrystalline wax, petroleum waxes, and the like, and mixtures thereof.

The gum base can further include effective amounts of bulking ingredients such as mineral adjuvants, which can serve as fillers and textural agents. Suitable mineral adjuvants include calcium carbonate, magnesium carbonate, alumina, aluminum hydroxide, aluminum silicate, talc, tricalcium phosphate and the like, which can serve as fillers and textural agents. These fillers or adjuvants can be used in the gum base in various amounts. Specifically the amount of filler, when used, will be present in an amount of about 15 to about 40 weight percent, specifically about 20 to about 30 weight percent, based on the weight of the gum base.

As used herein, the terms "gum," "chewing gum," and "bubble gum" are used interchangeably and are meant to include any gum composition. With regard to chewing gum compositions, such compositions contain a gum base, at least one sweetening agent, and various additives.

Generally, the chewing gum composition comprises a water insoluble gum base portion and a bulk portion comprising of additional ingredients (also known as additives). The gum base can vary greatly depending upon various factors such as the type of base desired, the consistency of gum desired, and the other components used in the composition to make the final chewing gum product. In some embodiments, the chewing gum base is present in an amount of about 5 to about 90 weight percent, where the weight percent is based on the total weight of the chewing gum composition. Within the range of about 5 to about 90, the water-insoluble gum base can be present in an amount of about 10 to about 50 weight percent, specifically the gum base can be present in an amount of about 15 to about 40 weight percent, and even more specifically the gum base can be present in an amount of about 20 to about 30 weight percent.

As used herein, the term "water-soluble" encompasses compounds, which possess a water solubility of at least 1 gram/liter at 25° C. As used herein, the term "water-insoluble" encompasses compounds, which possess a water solubility of less than at least 1 gram/liter at 25° C.

In some embodiments, there is provided a photo-degradable chewing gum composition comprising an elastomer; a block copolymer having a structure of formula (I) described above wherein m and p are integers in the range of 1 to 500, and n is an integer in the range of 2 to 100; and at least one or more additional ingredients. Suitable additional ingredients include sweetening agents, flavorants, flavor modulators, flavor potentiators, aroma agents, cooling agents (coolants), warming agents, coloring agents, breath fresheners, mouth moisteners, humectants, acidulants, buffering agents, tingling agents, oral care agents, throat care agents, medicaments, antioxidants, preservatives, and combinations thereof. Some of these additional ingredients can serve more than one purpose. For example, a sweetening agent such as sucrose, sorbitol, other sugar alcohols, and combinations thereof can also function as bulking agents. A combination comprising at least one of the foregoing additional ingredients is often used.

In some embodiments, the chewing gum includes a sweetening agent to provide a sweet taste to the gum composition. Sweetening agents can include sugar sweeteners, sugarless sweeteners, high intensity sweeteners, or a combination of at least two of the foregoing sweetening agents.

Sugar sweeteners generally include saccharides. Suitable sugar sweeteners include monosaccharides, disaccharides and polysaccharides such as sucrose (sugar), dextrose, maltose, dextrin, xylose, ribose, glucose, mannose, galactose, fructose (levulose), lactose, invert sugar, fructooligosaccharide syrups, partially hydrolyzed starch, corn syrup solids, such as high fructose corn syrup, and combinations thereof.

Suitable sugarless sweeteners include sugar alcohols (or polyols) such as sorbitol, xylitol, mannitol, galactitol, maltitol, hydrogenated isomaltulose (isomalt), lactitol, erythritol, hydrogenated starch hydrolysate, and combinations thereof. Suitable hydrogenated starch hydrolysates include those disclosed in U.S. Pat. No. 4,279,931 to Verwaerde et al. and various hydrogenated glucose syrups and/or powders, which contain sorbitol, hydrogenated disaccharides, hydrogenated higher polysaccharides, or mixtures thereof. Hydrogenated starch hydrolysates are primarily prepared by the controlled catalytic hydrogenation of corn syrups. The resulting hydrogenated starch hydro lysates are mixtures of monomeric, dimeric, and polymeric saccharides. The ratios of these different saccharides give different hydrogenated starch hydro lysates different properties. Mixtures of hydrogenated starch hydrolysates are commercially available under the trade name LYCASIN from Roquette Freres of France, and under the trade name HYSTAR, from Lonza, Inc., of Fair Lawn, N.J., USA.

A "high intensity sweetener" as used herein means agents having a sweetness at least 100 times that of sugar (sucrose) on a per weight basis, specifically at least 500 times that of sugar on a per weight basis. In some embodiments the high intensity sweetener is at least 1,000 times that of sugar on a per weight basis, more specifically at least 5,000 times that of sugar on a per weight basis. The high intensity sweetener can be selected from a wide range of materials, including water-soluble natural and artificial sweeteners, derivatives of water-soluble sweeteners, dipeptide based sweeteners, and protein based sweeteners. Any combination comprising two or more high intensity sweetener can be used. One or more of the high intensity sweeteners can further be combined with one or more of the foregoing sweeteners or sweetening agents. The high intensity sweetener can be used in a variety of distinct physical forms, for example those known in the art to provide an initial burst of sweetness and/or a prolonged sensation of sweetness. Without being limited thereto, such physical forms include free forms (e.g., spray dried or powdered), beaded forms, encapsulated forms, and combinations of the foregoing forms.

Without being limited to particular sweetening agents, representative categories and examples include (1) water-soluble sweetening agents such as dihydrochalcones, monellin, steviosides, Rebaudioside A, Rebaudioside B, Rebaudioside C, glycyrrhizin, dihydroflavenol, and sugar alcohols such as sorbitol, mannitol, maltitol, monatin, and L-aminodicarboxylic acid aminoalkenoic acid ester amides, such as those disclosed in U.S. Pat. No. 4,619,834 to Zanno et al., or a combination comprising at least one of the foregoing; (2) water-soluble artificial sweeteners such as saccharin, soluble saccharin salts, i.e., sodium or calcium saccharin salts, cyclamate salts, acesulfame salts, such as the sodium, ammonium or calcium salt of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (Acesulfame-K), the free acid form of saccharin, or a combination comprising at least one of the foregoing; (3) dipeptide based sweeteners, for example the L-aspartic acid derived sweeteners such as L-aspartyl-L-phenylalanine methyl ester (Aspartame) and materials described in U.S. Pat. No. 3,492,131 to Schlatter et al., L-alpha-aspartyl-N-(2,2,4,4-tetramethyl-3-thietanyl)-D-alaninamide hydrate (Alitame), methyl esters of L-aspartyl-L-phenylglycine and L-aspartyl-L-2,5-dihydrophenyl-glycine, L-alpha-aspartyl-L-phenylglycine methyl ester, L-alpha-aspartyl-L-2,5-dihydrophenylglycine methyl ester, L-aspartyl-2,5-dihydro-L-phenylalanine; L-alpha-aspartyl-2,5-dihydrophenylalanine methyl ester, L-aspartyl-L-(1-cyclohexen)-alanine, N—(N-(3,3-dimethylbutyl)-L-alpha-aspartyl)-L-phenylalamine methyl ester (Neotame), or a combination thereof; (4) derivatives of water-soluble sweeteners, such as derivatives of steviosides, derivatives of Rebaudioside A, derivatives of Rebaudioside B, derivatives of Rebaudioside C, chlorinated derivatives of ordinary sugar (sucrose), e.g., chlorodeoxy-sugar derivatives such as derivatives of chlorodeoxysucrose or chlorodeoxygalactosucrose, known, for example, under the product designation of Sucralose; examples of chlorodeoxysucrose and chlorodeoxygalactosucrose derivatives include 1-chloro-1'-deoxysucrose; 4-chloro-4-deoxy-alpha-D-galactopyranosyl-alpha-D-fructofuranoside, 4-chloro-4-deoxygalactosucrose, 4-chloro-4-deoxy-alpha-D-galactopyranosyl-1-chloro-1-deoxy-beta-D-fructofuranoside, 4,1'-dichloro-4,1'-dideoxygalactosucrose; 1',6'-dichloro-1',6'-dideoxysucrose; 1,6-dichloro-1,6-dideoxy-β-D-fructofuranosyl-4-chloro-4-deoxy-α-D-galactopyranoside; 4-chloro-4-deoxy-alpha-D-galactopyranosyl-1,6-dichloro-1,6-dideoxy-beta-D-fructofuranoside, or 4,1',6'-trichloro-4,1',6'-trideoxygalactosucrose; 4,6-dichloro-4,6-dideoxy-alpha-D-galactopyranosyl-6-chloro-6-deoxy-beta-D-fructofuranoside, or 4,6,6'-trichloro-4,6,6'-trideoxygalactosucrose; 6,1',6'-trichloro-6,1',6'-trideoxysucrose; 4,6-dichloro-4,6-dideoxy-alpha-D-galactopyranosyl-1,6-dichloro-1,6-dideoxy-beta-D-fructofuranoside, or 4,6,1',6'-tetrachloro-4,6,1',6'-tetradeoxygalacto-sucrose; 4,6,1',6'-tetradeoxy-sucrose, or a combination thereof; (5) protein based sweeteners such as thaumaoccous danielli, thaumatin, talin, or a combination thereof; and (6) amino acid based sweeteners.

In some embodiments, the sweetening agents include sorbitol, mannitol, aspartame, acesulfame potassium salt, and combinations thereof. The sweetening agents can be present in a suitable amount depending upon the desired level of sweetness. In some embodiments the sweeteners are present in an amount of about 35 to about 80 weight percent of the chewing gum composition. Within the range of about 35 to about 80, the amount can be about 45 to about 75 weight percent, specifically, the amount can be about 50 to about 65 weight percent.

In some embodiments, the chewing gum composition can further include one or more flavorants (also known as flavorings, flavors or flavoring agents). Suitable flavorants include artificial and natural flavorants known in the art, for example synthetic flavor oils, natural flavoring aromatics and/or oils, oleoresins, extracts derived from plants, leaves, flowers, fruits, and the like, and combinations comprising at least one of the foregoing flavorants. Non-limiting representative flavors include oils such as spearmint oil, cinnamon oil, oil of wintergreen (methyl salicylate), peppermint oil, clove oil, bay oil, anise oil, eucalyptus oil, thyme oil, cedar leaf oil, oil of nutmeg, allspice, oil of sage, mace, oil of bitter almonds, cassia oil, and citrus oils including lemon, orange, lime, grapefruit, vanilla, fruit essences, including apple, pear, peach, grape, strawberry, raspberry, blackberry, cherry, plum, pineapple, apricot, banana, melon, tropical fruit, mango, mangosteen, pomegranate, papaya, honey lemon, and the like, and combinations thereof. Specific flavorants are mints such as peppermint, spearmint, artificial vanilla, cinnamon derivatives, and various fruit flavors.

Examples of artificial, natural, and synthetic fruit flavorants include coconut, coffee, chocolate, vanilla, lemon, grapefruit, orange, lime, yazu, sudachi, menthol, licorice, caramel, honey, peanut, walnut, cashew, hazelnut, almonds, pineapple, strawberry, raspberry, blackberry, tropical fruits, cherries, cinnamon, peppermint, wintergreen, spearmint, eucalyptus, and mint, fruit essence such as from apple, pear, peach, grape, blueberry, strawberry, raspberry, cherry, plum, pineapple, apricot, banana, melon, apricot, ume, cherry, raspberry, blackberry, tropical fruit, mango, mangosteen, pomegranate, papaya, and the like, and combinations thereof.

Other types of flavorants include various aldehydes and esters such as cinnamyl acetate, cinnamaldehyde, citral diethylacetal, dihydrocarvyl acetate, eugenyl formate, p-methylamisol, acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), 2-dodecenal (citrus, mandarin), and combinations thereof.

Other potential flavors whose release profiles can be managed include a milk flavor, a butter flavor, a cheese flavor, a cream flavor, a yogurt flavor, a vanilla flavor, a tea or coffee flavor, such as a green tea flavor, a oolong tea flavor, a cocoa flavor, a chocolate flavor, a mint flavor, such as peppermint, spearmint, and Japanese mint; spicy flavors, such as asafetida, ajowan, anise, angelica, fennel, allspice, cinnamon, chamomile, mustard, cardamom, caraway, cumin, clove, pepper, coriander, sassafras, savory, Zanthoxyli Fructus, perilla, juniper berry, ginger, star anise, horseradish, thyme, a tarragon, dill, capsicum, nutmeg, basil, marjoram, rosemary, bay leaf, and wasabi; alcoholic flavors, such as wine, whisky, brandy, rum, gin, and liqueur; floral and vegetable flavors, such as onion, garlic, cabbage, carrot, celery, mushroom, tomato, and any combinations thereof. Commonly used flavorings include mints such as peppermint, menthol, spearmint, artificial vanilla, cinnamon derivatives, and various fruit flavors, whether employed individually or in admixture. Flavors can also provide breath freshening properties, particularly the mint flavors when used in combination with cooling agents. In some embodiments, the composition can further include fruit juices.

The flavoring agents can be used in many distinct physical forms. Such physical forms include liquid and/or dried form. In some embodiments, the flavoring agents can be in free (non-encapsulated) forms, spray dried forms, freeze dried forms, powdered forms, beaded forms, encapsulated forms, slices, pieces, and mixtures thereof. When employed in a spray-dried form, suitable drying means such as spray-drying a liquid can be used. Alternatively, the flavoring agent can be absorbed onto water-soluble materials, such as cellulose, starch, sugar, maltodextrin, gum arabic and so forth or it can be encapsulated. In still other embodiments, the flavoring agent can be adsorbed onto silica, zeolites, and the like. The particle size of the flavoring agents can be less than 3 millimeters, less than 2 millimeters or specifically less than 1 millimeter, calculated as the longest dimension of the particle. The natural flavoring agent can have a particle size about 3 micrometers to 2 millimeters, specifically about 4 micrometers to about 1 millimeter. The flavorants can be used in the amount about 0.01 to about 30 weight percent of the gum composition depending on the desired intensity of the aromas used. Specifically, the content of the flavorants is in the range of about 0.2 to about 3 weight percent of the gum composition.

In some embodiments, the chewing gum can further include flavor modulators and/or flavor potentiators. Flavor modulators can impart a characteristic of their own that complements or negates a characteristic of another component. For example, flavors can be compounded to have additional sweet notes by the inclusion of flavor modulators or potentiators, such as vanilla, vanillin, ethyl maltol, furfural, ethyl propionate, lactones, and combinations thereof. The flavor modulators can be used in the amount about 0.01 to about 30 weight percent of the gum composition depending on the desired intensity of the aromas used. Specifically, the content of the flavor modulators is in the range of about 0.2 to about 3 weight percent of the gum composition.

Flavor potentiators are materials that intensify, supplement, modify or enhance the taste or aroma perception of an original material without introducing a characteristic taste or aroma perception of their own. In some embodiments, flavor potentiators are designed to intensify, supplement, modify, or enhance the perception of flavor, sweetness, tartness, umami, kokumi, saltiness or a combination thereof. The flavor potentiators can be used in the amount about 0.01 to about 30 weight percent of the gum composition depending on the desired intensity of the aromas used. Specifically, the content of the flavor potentiators is in the range of about 0.2 to about 3 weight percent of the gum composition.

Exemplary flavor modulators or flavor potentiators include monoammonium glycyrrhizinate, licorice glycyrrhizinates, citrus aurantium, alapyridaine, alapyridaine (N-(1-carboxyethyl)-6-(hydroxymethyl)pyridinium-3-ol) inner salt, miraculin, curculin, strogin, mabinlin, gymnemic acid, cynarin, glupyridaine, pyridinium-betain compounds, neotame, thaumatin, neohesperidin dihydrochalcone, tagatose, trehalose, maltol, ethyl maltol, phyllodulcin, vanilla extract, vanilla oleoresin, vanillin, sugar beet extract (alcoholic extract), sugarcane leaf essence (alcoholic extract), compounds that respond to G-protein coupled receptors (T2R5 and T1R5), and combinations thereof. In some embodiments, sugar acids, sodium chloride, potassium chloride, sodium acid sulfate, or a combination comprising at least one of the foregoing are used. In other embodiments, glutamates such as monosodium glutamate, monopotassium glutamate, hydrolyzed vegetable protein, hydrolyzed animal protein, yeast extract, and combinations thereof are included. Further examples include adenosine monophosphate (AMP), glutathione, and nucleotides such as inosine monophosphate, disodium inosinate, xanthosine monophosphate, guanylate monophosphate, and combinations thereof. Further examples of flavor potentiator compositions that impart kokumi are also included in U.S. Pat. No. 5,679,397 to Kuroda et al.

In some embodiments of the chewing gum, a sweet taste can also come from flavorants and/or flavor modulators or potentiators.

The amount of flavorants, flavor modulators and/or flavor potentiators used herein can be a matter of preference subject to such factors as the type of final chewing gum product composition, the individual flavor, the gum base employed, and the strength of flavor desired. Thus, the amount of flavorants can be varied in order to obtain the result desired in the final product and such variations are within the capabilities of those skilled in the art without the need for undue experimentation.

In some embodiments, the chewing gum contains aroma agents including natural and synthetic flavorings such as natural vegetable components, flavoring aromatics and/or oils, essential oils, essences, extracts, powders, food-grade acids, oleoresins and extracts derived from plants, leaves, flowers, fruits, and the like, and combinations thereof. The aroma agents can be in liquid or powdered form. The aroma agents can be used in the amount about 0.01 to about 30 weight percent of the gum composition depending on the desired intensity of the aromas used. Specifically, the content of the aroma agents is in the range of about 0.2 to about 3 weight percent of the gum composition.

In some embodiments, the chewing gum can contain cooling agents. Cooling agents, also known as coolants, are additives that provide a cooling or refreshing effect in the mouth, in the nasal cavity, or on skin. Menthyl-based coolants as used herein include menthol and menthol derivatives. Menthol (also known as 2-(2-propyl)-5-methyl-1-cyclohexanol) is available in artificial form, or naturally from sources such as peppermint oil. Menthol derivatives include menthyl ester-based and menthyl carboxamide-based cooling compounds such as menthyl carboxamide, N-ethyl-p-menthane carboxamide, monomenthyl succinate, monomenthyl succinate, monomenthyl glutarate, menthyl 2-pyrrolidone-5-carboxylate, monomenthyl 3-methyl maleate, menthyl acetate, menthyl lactate, menthyl salicylate, 2-isopropanyl-5-methylcyclohexanol, 3-L-menthoxypropane-1,2-diol, menthane, menthone, menthone ketals, menthone glycerol ketals, menthyl glutarate esters, N-ethyl-p-menthane-3-carboxamide (WS-3), or a combination thereof. Additional menthyl-based coolants, specifically menthylcarboxamides, are described in U.S. Pat. No. 7,923,577 to Bardsley et al.

Other cooling agents that can be used in combination with or in the absence of the menthyl-based coolants include, for example 2-mercapto-cyclo-decanone, hydroxycarboxylic acids with 2 to 6 carbon atoms, xylitol, erythritol, alpha-dimethyl succinate, menthyl lactate, acyclic carboxamides such as N-2,3-trimethyl-2-isopropyl butanamide, and combinations thereof. Additional cooling agents include the 1-tert-butylcyclohexanecarboxamides described in U.S. Patent Application Publication Nos. US 2011/0070171 A1 and US 2011/0070329 A1 of Kazimierski et al. Cooling compositions comprising a primary cooling compound, a secondary cooling compound, and an ingestible non-polar solvent are described in U.S. Patent Application Publication No. US 2011/0091531 A1 of Furrer et al.

The cooling agents can be present in a suitable amount depending upon the desired level of cooling intensity. In some embodiments, the cooling agents are present in an amount of about 0.01 to about 1.5 weight percent of the chewing gum composition. Within the range of about 0.01 to about 1.5 weight percent, the cooling agents can be about 0.05 to about 1.25 weight percent, specifically the cooling agents can be about 0.1 to about 1 weight percent.

Warming agents can be selected from a wide variety of compounds known to provide the sensory signal of warming to the user. These compounds offer the perceived sensation of warmth, particularly in the oral cavity, and often enhance the perception of flavors, sweeteners and other organoleptic components. Among the useful warming compounds included are vanillyl alcohol n-butylether (TK-1000) supplied by Takasago Perfumary Company Limited, Tokyo, Japan, vanillyl alcohol methyl ether, vanillyl alcohol ethyl ether, vanillyl alcohol n-propyl ether, vanillyl alcohol isopropyl ether, vanillyl alcohol isobutyl ether, vanillyl alcohol n-pentyl ether, vanillyl alcohol isoamyl ether, vanillyl alcohol n-hexylether, gingerol, shogaol, paradol, zingerone, capsaicin, dihydrocapsaicin, nordihydrocapsaicin, homocapsaicin, homodihydrocapsaicin, ethanol, isopropyl alcohol, isoamyl alcohol, benzyl alcohol, glycerin, and combinations thereof. The warming agents can be present in a suitable amount depending upon the desired level of warming intensity. In some embodiments, the warming agents are present in an amount of about 0.01 to about 1.5 weight percent of the chewing gum composition. Within the range of about 0.01 to about 1.5 weight percent, the warming agents can be about 0.05 to about 1.25 weight percent, specifically the warming agents can be about 0.1 to about 1 weight percent.

Coloring agents (also known as colorants or colorings) can be used in amounts effective to produce a desired color for the chewing gum. Suitable coloring agents include pigments, which can be incorporated in amounts up to about 6 weight percent by weight of the chewing gum. For example, titanium dioxide can be incorporated in amounts of about 0.1 to about 2 weight percent and specifically about 0.15 to about 1 weight percent by weight of the chewing gum. Suitable coloring agents also include natural food colors and dyes suitable for food, drug, and cosmetic applications.

Suitable colorants include annatto extract (E160b), bixin, norbixin, astaxanthin, dehydrated beets (beet powder), beetroot red/betanin (E162), ultramarine blue, canthaxanthin (E161g), cryptoxanthin (E161c), rubixanthin (E161d), violanxanthin (E161e), rhodoxanthin (E161f), caramel (E150 (a-d)), β-apo-8'-carotenal (E160e), β-carotene (E160a), alpha carotene, gamma carotene, ethyl ester of beta-apo-8 carotenal (E160f), flavoxanthin (E161a), lutein (E161b), cochineal extract (E120), carmine (E132), carmoisine/azorubine (E122), sodium copper chlorophyllin (E141), chlorophyll (E140), toasted partially defatted cooked cottonseed flour, ferrous gluconate, ferrous lactate, grape color extract, grape skin extract (enocianina), anthocyanins (E163), haematococcus algae meal, synthetic iron oxide, iron oxides and hydroxides (E172), fruit juice, vegetable juice, dried algae meal, tagetes (Aztec marigold) meal and extract, carrot oil, corn endosperm oil, paprika, paprika oleoresin, phaffia yeast, riboflavin (E101), saffron, titanium dioxide, turmeric (E100), turmeric oleoresin, amaranth (E123), capsanthin/capsorbin (E160c), lycopene (E160d), FD&C blue #1, FD&C blue #2, FD&C green #3, FD&C red #3, FD&C red #40, FD&C yellow #5 and FD&C yellow #6, tartrazine (E102), quinoline yellow (E104), sunset yellow (E110), ponceau (E124), erythrosine (E127), patent blue V (E131), titanium dioxide (E171), aluminium (E173), silver (E174), gold (E175), pigment rubine/lithol rubine BK (E180), calcium carbonate (E170), carbon black (E153), black PN/brilliant black BN (E151), green S/acid brilliant green BS (E142), FD&C aluminum lakes, and combinations thereof. The coloring agents can be present in a suitable amount depending upon the desired level of coloring intensity. In some embodiments, the coloring agents are present in an amount of about 0.005 to about 1.25 weight percent of the chewing gum composition. Within the range of about 0.005 to about 1 weight percent, the coloring agents can be about 0.01 to about 1 weight percent, specifically the warming agents can be about 0.02 to about 0.8 weight percent.

Exemplary breath fresheners include zinc citrate, zinc acetate, zinc fluoride, zinc ammonium sulfate, zinc bromide, zinc iodide, zinc chloride, zinc nitrate, zinc fluorosilicate, zinc gluconate, zinc tartarate, zinc succinate, zinc formate, zinc chromate, zinc phenol sulfonate, zinc dithionate, zinc sulfate, silver nitrate, zinc salicylate, zinc glycerophosphate, copper nitrate, chlorophyll, copper chlorophyll, chlorophyllin, hydrogenated cottonseed oil, chlorine dioxide, beta cyclodextrin, zeolite, silica-based material, carbon-based material, enzymes such as laccase, and combinations thereof. Breath fresheners can include essential oils as well as various aldehydes and alcohols. Essential oils used as breath fresheners can include oils of spearmint, peppermint, wintergreen, sassafras, chlorophyll, citral, geraniol, cardamom, clove, sage, carvacrol, eucalyptus, cardamom, magnolia bark extract, marjoram, cinnamon, lemon, lime, grapefruit, orange, and combinations thereof. Aldehydes such as cinnamic aldehyde and salicylaldehyde can be used. Additionally, chemicals such as menthol, carvone, iso-garrigol, and anethole can function as breath fresheners. The breath fresheners can be present in a suitable amount depending upon the desired level of intensity. In some embodiments, the breath fresheners are present in an amount of about 0.01 to about 2 weight percent of the chewing gum composition. Within the range of about 0.01 to about 2 weight percent, the breath fresheners can be about 0.05 to about 1.25 weight percent; specifically, the breath fresheners can be about 0.1 to about 1 weight percent.

Exemplary mouth moisteners include saliva stimulators such as acids and salts including acetic acid, adipic acid, ascorbic acid, butyric acid, citric acid, formic acid, fumaric acid, glyconic acid, lactic acid, phosphoric acid, malic acid, oxalic acid, succinic acid, tartaric acid, and salts of the foregoing acids. Mouth moisteners can include hydrocolloid materials that hydrate and can adhere to oral surface to provide a sensation of mouth moistening. Hydrocolloid materials can include naturally occurring materials such as plant exudates, seed gums, and seaweed extracts or they can be chemically modified materials such as cellulose, starch, or natural gum derivatives. Furthermore, hydrocolloid materials can include pectin, gum arabic, acacia gum, alginates, agar, carageenans, guar gum, xanthan gum, locust bean gum, gelatin, gellan gum, galactomannans, tragacanth gum, karaya gum, curdlan, konjac, chitosan, xyloglucan, beta glucan, furcellaran, gum ghatti, tamarin, and bacterial gums. Mouth moisteners can include modified natural gums such as propylene glycol alginate, carboxymethyl locust bean gum, low methoxyl pectin, or a combination thereof. Modified celluloses can be included such as microcrystalline cellulose, carboxymethylcellulose (CMC), methylcellulose (MC), hydroxypropylmethylcellulose (HPMC), hydroxypropylcellulose (MPC), or a combination thereof. The mouth moisteners can be present in a suitable amount depending upon the desired level of intensity. In some embodiments, the mouth moisteners are present in an amount of about 0.01 to about 2 weight percent of the chewing gum composition. Within the range of about 0.01 to about 2 weight percent, the mouth moisteners can be about 0.05 to about 1.25 weight percent; specifically, the mouth moisteners can be about 0.1 to about 1 weight percent.

Similarly, humectants, which can provide a perception of mouth hydration, can be included. Such humectants can include glycerol, sorbitol, polyethylene glycol, erythritol, xylitol, and combinations thereof. Additionally, in some embodiments, fats can provide a perception of mouth moistening. Such fats can include medium chain triglycerides, vegetable oils, fish oils, mineral oils, and combinations thereof. The humectants can be present in a suitable amount depending upon the desired level of intensity. In some embodiments, the humectants are present in an amount of about 0.01 to about 2 weight percent of the chewing gum composition. Within the range of about 0.01 to about 2 weight percent, the humectants can be about 0.05 to about 1.25 weight percent; specifically, the humectants can be about 0.1 to about 1 weight percent.

Suitable acidulants illustratively include acetic acid, citric acid, fumaric acid, hydrochloric acid, lactic acid and nitric acid as well as sodium citrate, sodium bicarbonate, sodium carbonate, sodium or potassium phosphate, magnesium oxide, potassium metaphosphate, sodium acetate, and combinations thereof. The acidulants can be present in a suitable amount depending upon the desired level of intensity. In some embodiments, the acidulants are present in an amount of about 0.1 to about 3 weight percent of the chewing gum composition. Within the range of about 0.1 to about 3 weight percent, the acidulants can be about 0.5 to about 2.5 weight percent; specifically, the humectants can be about 0.75 to about 2 weight percent.

Exemplary buffering agents include sodium bicarbonate, sodium phosphate, sodium hydroxide, ammonium hydroxide, potassium hydroxide, sodium stannate, triethanolamine, citric acid, hydrochloric acid, sodium citrate, and combinations thereof. The buffering agents can be present in a suitable amount depending upon the desired level of intensity. In some embodiments, the buffering agents are present in an amount of about 0.01 to about 2 weight percent of the chewing gum composition. Within the range of about 0.01 to about 2 weight percent, the buffering agents can be about 0.05 to about 1.25 weight percent; specifically, the buffering agents can be about 0.1 to about 1 weight percent.

In some embodiments, a tingling sensation can be provided. Tingling agents include jambu, and alkylamides extracted from materials such as jambu or sanshool. Tingling agents can be present in a suitable amount depending upon the desired level of intensity. In some embodiments, the tingling agents are present in an amount of about 0.01 to about 2 weight percent of the chewing gum composition. Within the range of about 0.01 to about 2 weight percent, the tingling agents can be about 0.05 to about 1.25 weight percent; specifically, the tingling agents can be about 0.1 to about 1 weight percent.

Suitable oral care agents include breath fresheners, tooth whiteners, antimicrobial agents, tooth mineralizers, tooth decay inhibitors, topical anesthetics, mucoprotectants, stain removers, oral cleaning agents, bleaching agents, desensitizing agents, dental remineralization agents, antibacterial agents, anticaries agents, plaque acid buffering agents, surfactants and anticalculus agents, and combinations thereof. Examples of such ingredients include, hydrolytic agents including proteolytic enzymes, abrasives such as hydrated silica, calcium carbonate, sodium bicarbonate and alumina, other active stain-removing components such as surface-active agents, including anionic surfactants such as sodium stearate, sodium palminate, sulfated butyl oleate, sodium oleate, salts of fumaric acid, glycerol, hydroxylated lecithin, sodium lauryl sulfate and chelators such as polyphosphates, which are typically employed as tartar control ingredients. Oral care ingredients can also include tetrasodium pyrophosphate and sodium tri-polyphosphate, sodium bicarbonate, sodium acid pyrophosphate, xylitol, sodium hexametaphosphate, and combinations thereof.

In addition, suitable oral care agents include peroxides such as carbamide peroxide, calcium peroxide, magnesium peroxide, sodium peroxide, hydrogen peroxide, and peroxydiphospate, and combinations thereof. In some embodiments, potassium nitrate and potassium citrate are included. Other examples can include casein glycomacropeptide, calcium casein peptone-calcium phosphate, casein phosphopeptides, casein phosphopeptide-amorphous calcium phosphate (CPP-ACP), and amorphous calcium phosphate. Still other examples include papaine, krillase, pepsin, trypsin, lysozyme, dextranase, mutanase, glycoamylase, amylase, glucose oxidase, and combinations thereof.

Suitable oral care agents include surfactants that achieve increased prophylactic action and render the oral care ingredients more cosmetically acceptable. Surfactants used as oral care agents include detersive materials that impart to the composition detersive and foaming properties. Suitable surfactants include sodium stearate, sodium ricinoleate, sodium lauryl sulfate, water-soluble salts of higher fatty acid monoglyceride monosulfates, such as the sodium salt of the monosulfated monoglyceride of hydrogenated coconut oil fatty acids, higher alkyl sulfates such as sodium lauryl sulfate, alkyl aryl sulfonates such as sodium dodecyl benzene sulfonate, higher alkyl sulfoacetates, sodium lauryl sulfoacetate, higher fatty acid esters of 1,2-dihydroxy propane sulfonate, and the substantially saturated higher aliphatic acyl amides of lower aliphatic amino carboxylic acid compounds, such as those having 12 to 16 carbons in the fatty acid, alkyl or acyl radicals, and the like. Examples of the last mentioned amides are N-lauroyl sarcosine, and the sodium, potassium, and ethanolammonium salts of N-lauroyl sarcosine, N-myristoyl sarcosine, and N-palmitoyl sarcosine.

In addition to surfactants, oral care ingredients can include antibacterial agents such as triclosan, chlorhexidine, zinc citrate, silver nitrate, copper, limonene, cetyl pyridinium chloride, and combinations thereof.

Anticaries agents can include fluoride ion sources such as sodium fluoride, potassium fluoride, sodium fluorosilicate, ammonium fluorosilicate, potassium fluoride, sodium monofluorophosphate, stannous fluoride, potassium stannous fluoride, sodium hexafluorostannate, stannous chlorofluoride, and combinations thereof. Further examples of anticaries agents are included in U.S. Pat. No. 5,227,154 to Reynolds, U.S. Pat. No. 5,378,131 to Greenberg, and U.S. Pat. No. 6,685,916 to Holme et al. Oral care agents can be present in a suitable amount depending upon the desired level of care.

In some embodiments, the oral care agents are present in an amount of about 0.01 to about 2 weight percent of the chewing gum composition. Within the range of about 0.01 to about 2 weight percent, the oral care agents can be about 0.05 to about 1.25 weight percent; specifically, the oral care agents can be about 0.1 to about 1 weight percent.

Throat care or throat-soothing ingredients include analgesics, antihistamines, anesthetics, demulcents, mucolytics, expectorants, antitussive, and antiseptics. In some embodiments, throat-soothing agents include honey, propolis, aloe vera, glycerine, menthol and a combination thereof is employed. Throat care agents can be present in a suitable amount depending upon the desired level of care. In some embodiments, the throat care agents are present in an amount of about 0.01 to about 2 weight percent of the chewing gum composition. Within the range of about 0.01 to about 2 weight percent, the throat care agents can be about 0.05 to about 1.25 weight percent; specifically, the throat care agents can be about 0.1 to about 1 weight percent.

Medicaments can be included in the chewing gum product. Non-limiting illustrative categories and specific examples include antihistamines, decongestants (sympathomimetics), antitussives (cough suppressants), expectorants, anesthetics, analgesics, demulcents, antibacterial agents, antiviral agents, anti-inflammatories, antacids, antifungal agents, chemotherapeutics, diuretics, psychotherapeutic agents, homeopathic agents, anticholinergics, throat-soothing agents, antinauseants, cardiovascular agents, various alkaloids, laxatives, appetite suppressants, ACE-inhibitors, anti-asthmatics, anti-cholesterolemics, anti-depressants, anti-diarrhea preparations, anti-hypertensives, anti-lipid agents, acne drugs, amino acid preparations, anti-uricemic drugs, anabolic preparations, appetite stimulants, bone metabolism regulators, contraceptives, endometriosis management agents, enzymes, erectile dysfunction therapies such as sildenafil citrate, fertility agents, gastrointestinal agents, homeopathic remedies, hormones, motion sickness treatments, muscle relaxants, osteoporosis preparations, oxytocics, parasympatholytics, parasympathomimetics, prostaglandins, respiratory agents, sedatives, smoking cessation aids such as bromocryptine or nicotine, tremor preparations, urinary tract agents, anti-ulcer agents, anti-emetics, hyper- and hypo-glycemic agents, thyroid and anti-thyroid preparations, terine relaxants, erythropoietic drugs, mucolytics, DNA and genetic modifying drugs, and nutritional supplements, including nutraceuticals, micronutrients, vitamins and co-enzymes. The pharmaceutically acceptable salts and prodrugs of the medicaments are also included unless specified otherwise. Some of these medicaments can serve more than one purpose. Combinations of the foregoing types of optional medicaments can be used. Two or more medicaments that have activity against the same or different symptoms can be used together in a combination.

Medicaments for the treatment of a cough, or a cold or flu symptom include elements, compounds or materials, alone or in combination, that have been used for, or have been shown to be useful for, the amelioration of at least one symptom commonly associated with cough, colds, or influenza. It is to be understood that a "medicament for the treatment of a cough, or a cold or flu symptom" includes medicaments that are also useful for the treatment of cold-like or flu-like symptoms arising from other sources, such as allergies, adverse environmental conditions, and the like. Cold, cold-like, flu, and flu-like symptoms as used herein include cough, coryza, nasal congestion, upper respiratory infections, allergic rhinitis, otitis, sinusitis, sneezing, and the discomfort, pain, fever and general malaise associated with colds, flu, allergies, adverse environmental conditions, and the like.

Examples of general categories of medicaments for the treatment of a cough, or a cold or flu symptom include antihistamines, decongestants (sympathomimetics), antitussives (cough suppressants), anti-inflammatories, homeopathic agents, expectorants, anesthetics, demulcents, analgesics, anticholinergics, throat-soothing agents, antibacterial agents, and antiviral agents. Some of these medicaments can serve more than one purpose. The pharmaceutically acceptable salts and prodrugs of the medicaments are also included unless specified otherwise. Two or more medicaments that have activity against the same or different symptoms of colds or coughs can be used together in a combination.

Exemplary antihistamines include azatadine, bromodiphenhydramine, brompheniramine, brompheniramine maleate, carbinoxamine, carbinoxamine maleate, cimetidine, chlorpheniramine, chlorpheniramine maleate, dexchlorpheniramine, diphenhydramine, diphenhydramine hydrochloride, doxylamine, phenindamine, pheniramine, phenyltoloxamine, pyrilamine, promethazine, triprolidine, loratadine, ranitidine, chlorcyclizine, terfenadine, clemastine fumarate, dimenhydrinate, prilamine maleate, tripelennamine hydrochloride, tripelennamine citrate, hydroxyzine pamoate, hydroxyzine hydrochloride, cyclizine lactate, cyclizine hydrochloride, meclizine hydrochloride, acrivastine, cetirizine hydrochloride, astemizole, levocabastine hydrochloride, cetirizine, and combinations thereof.

Exemplary decongestants include agents such as levopropoxyphene napsylate, noscapine, carbetapentane, caramiphen, chlophedianol, pseudoephedrine hydrochloride, phenylephrine, phenylpropanolamine, diphenhydramine, glaucine, pholcodine, benzonatate, ephedrine, ephinephrine, levodesoxyephedrine, oxymetazoline, naphazo line, propylhexedrine, xylometazoline, and combinations thereof.

Antitussives help relieve coughing. Examples of antitussives include codeine, dihydrocodeine, hydrocodone and hydromorphone, carbetapentane, caramiphen, hydrocodone bitartrate, chlorphedianol, noscarpine, dextromethorphan, and combinations thereof.

Expectorants include guaifenesin, aniseed, blood root, coltsfoot, elderflower, golden seal, grindelia, hyssop, lungwort, mullein, senega, thuja, thyme, vervain, glyceryl guaiacolate, terpin hydrate, N-acetylcysteine, bromhexine, ambroxol, domiodol, 3-iodo-1,2-propanediol and wild cherry, ammonium chloride, calcium iodide, iodinated glycerol, potassium guaiacolsulfonate, potassium iodide, sodium citrate, and combinations thereof.

Anaesthetics include etomidate, ketamine, propofol, and benodiazepines (e.g., chlordiazepoxide, diazepam, clorezepate, halazepam, flurazepam, quazepam, estazolam, triazolam, alprozolm, midazolam, temazepam, oxazepam, lorazepam), benzocaine, dyclonine, bupivacaine, etidocaine, lidocaine, mepivacaine, promoxine, prilocalne, procaine, proparcaine, ropivacaine, tetracaine, and combinations thereof. Other useful agents can include amobartital, aprobarbital, butabarbital, butalbital mephobarbital, methohexital, pentobarbital, phenobarbital, secobarbital, thiopental, paral, chloral hydrate, ethchlorvynol, clutethimide, methprylon, ethinamate, meprobamate, and combinations thereof.

Analgesics include opioids such as morphine, mepidine, dentanyl, sufentranil, alfentanil, aspirin, salicylamide, sodium salicylate, acetaminophen, ibuprofen, indomethacine, naproxen, atrin, isocome, midrin, axotal, firinal, phrenilin, ergot and ergot derivatives (wigraine, cafergot, ergostat, ergomar, dihydroergotamine), imitrex, and combinations thereof.

Anticholinergics include homatropine, atropine, scopolamine hydrogen bromide, L-hyoscyamine, L-alkaloids of belladonna, tincture of belladonna alkaloids, homatropine hydrogen bromide, homatropine methylbromide, methscopolamine, anisotropine, anisotropine with phenobarbital, clindinium, glycopyrrolate, hexocyclim, isopropamide, mepenzolate, methantheline, oxyphencyclimine, propantheline, tridihexethyl, dicyclomine, scopolamine, atropine, dicyclomine, flavoxate, ipratropium, oxybutynin, pirenzepine, tiotropium, tolterodine, tropicamide, trimethaphan, atracurium, doxacurium, mivacurium, pancuronium, tubocurarine, vecuronium, suxamethonium chloride, and combinations thereof.

Demulcents include coltsfoot, comfrey, corn silk, couchgrass, flaxseed, irish moss, lungwort, liquorice, mallow, marshmallow, mullein, oatmeal, parsley piert, slippery elm, and combinations thereof.

Antibacterial agents include those within the antibiotic classes of aminoglycosides, cephalosporins, macrolides, penicillins, quinolones, sulfonamides, and tetracyclines. Specific exemplary antibiotic agents include naficillin, oxacillin, vancomycin, clindamycin, erythromycin, trimethoprim-sulphamethoxazole, rifampin, ciprofloxacin, broad spectrum penicillin, amoxicillin, gentamicin, ceftriazoxone, cefotaxime, chloramphenicol, clavunate, sulbactam, probenecid, doxycycline, spectinomycin, cefixime, penicillin G, minocycline, β-lactamase inhibitors; meziocillin, piperacillin, aztreonam, norfloxacin, trimethoprim, ceftazidime, dapsone, neomycin, azithromycin, clarithromycin, amoxicillin, ciprofloxacin, and vancomycin.

Antiviral agents specifically or generally modulate the biological activity of viruses such as picornavirus, influenza virus, herpes viruses, herpes simplex, herpes zoster, enteroviruses, varicella and rhinovirus, which are associated with the common cold. Exemplary antiviral agents include acyclovir, trifluridine, idoxorudine, foscarnet, ganciclovir, zidovudine, dideoxycytosine, dideoxyinosine, dipyridamole, stavudine, cidofovir, famciclovir, valaciclovir, valganciclovir, acyclovir, didanosine, zalcitabine, rifimantadine, saquinavir, indinavir, ritonavir, ribavarin, nelfinavir, adefovir, nevirapine, delavirdine, efavirenz, abacavir, amantadine, emtricitabine, entecavir, tenofovir, zanamivir, oseltamivir, ICI-130, 685, impulsin, pleconaril, penciclovir, vidarabine, cytokines, and combinations thereof.

Anti-inflammatories include salicylic acid derivatives including aspirin, paraminophenol derivatives including acetaminophen, indole and indene acetic acids including indomethacin, sulindac and etodalac, heteroaryl acetic acids including tolmetin diclofenac and ketorolac, aryl propionic acid derivatives including ibuprofen, naproxen, ketoprofen, fenopren, ketorlac, carprofen, oxaprozine, anthranilic acids including mefenamic acid, meclofenamic acid, and enolic acids including piroxicam, tenoxicam, phenylbutazone and oxyphenthatrazone.

Antacids include cimetidine, ranitidine, nizatidine, famotidine, omeprazole, bismuth antacids, metronidazole antacids, tetracycline antacids, clarthromycin antacids, hydroxides of aluminum, magnesium, sodium bicarbonates, calcium bicarbonate and other carbonates, silicates, phosphates, and combinations thereof.

Antifungal agents include, for example, ketoconazole, fluconazole, nystatin, itraconazole, clomitrazo le, natamycin, econazole, isoconazole, oxiconazole, thiabendazole, tiaconazole, voriconazole, terbinafine, amorolfine, micfungin, amphotericin B, and combinations thereof.

Chemotherapeutics agents include cisplatin (CDDP), procarbazine, mechlorethamine, cyclophosphamide, camptothecin, ifosfamide, melphalan, chlorambucil, bisulfan, nitrosurea, dactinomycin, daunorubicin, doxorubicin, bleomycin, plicomycin, mitomycin, etoposide (VP16), tamoxifen, taxol, transplatinum, 5-fluorouracil, vincristin, vinblastin and methotrexate and analogs or derivative variants thereof, and combinations thereof.

Diuretics include but are not limited to acetazolamide, dichlorphenamide, methazolamide, furosemide, bumetanide, ethacrynic acid torseimde, azosemide, muzolimine, piretanide, tripamide, bendroflumethiazide, benzthiazide, chlorothiazide, hydrochlorothiazide, hydroflumethiazide, methyclothiazide, polythiazide, trichlormethiazide, indapamide, metolazone, quinethazone, amiloride, triamterene, sprionolactone, canrenone, potassium canrenoate, and combinations thereof.

Psychotherapeutic agents include thorazine, serentil, mellaril, millazine, tindal, permitil, prolixin, trilafon, stelazine, suprazine, taractan, navan, clozaril, haldol, halperon, loxitane, moban, orap, risperdal, alprazolam, chlordiaepoxide, clonezepam, clorezepate, diazepam, halazepam, lorazepam, oxazepam, prazepam, buspirone, elvavil, anafranil, adapin, sinequan, tofranil, surmontil, asendin, norpramin, pertofrane, ludiomil, pamelor, vivactil, prozac, luvox, paxil, zoloft, effexor, welibutrin, serzone, desyrel, nardil, parnate, eldepryl, and combinations thereof.

Appetite suppressants include benzphetamine, diethylpropion, mazindol, phendimetrazine, phentermine, hoodia, ephedra, and caffeine. Additional appetite suppressant are commericailly under the following trade names: Adipex, Adipost, Bontril PDM, Bontril Slow Release, Didrex, Fastin, Ionamin, Mazanor, Melfiat, Obenix, Phendiet, Phendiet-105, Phentercot, Phentride, Plegine, Prelu-2, Pro-Fast, PT 105, Sanorex, Tenuate, Sanorex, Tenuate, Tenuate Dospan, Tepanil Ten-Tab, Teramine, Zantryl and combinations thereof.

Nutraceuticals and micronutrients include herbs and botanicals such as aloe, bilberry, bloodroot, calendula, capsicum, chamomile, cat's claw, echinacea, garlic, ginger, ginko, goldenseal, various ginseng, green tea, golden seal, guarana, kava kava, lutein, nettle, passionflower, rosemary, saw palmetto, St. John's wort, thyme, valerian, and combinations thereof. Also included are mineral supplements such as calcium, copper, iodine, iron, magnesium, manganese, molybdenum, phosphorous, zinc, selenium, and combinations thereof. Other nutraceuticals that can be added include fructo-oligosaccharides, glucosamine, grapeseed extract, cola extract, guarana, ephedra, inulin, phytosterols, phytochemicals, catechins, epicatechin, epicatechin gallate, epigallocatechin, epigallocatechin gallate, isoflavones, lecithin, lycopene, oligofructose, polyphenols, flavanoids, flavanols, flavonols, and psyllium as well as weight loss agents such as chromium picolinate and phenylpropanolamine. Vitamins and co-enzymes include water or fat-soluble vitamins such as thiamin, riboflavin, nicotinic acid, pyridoxine, pantothenic acid, biotin, folic acid, flavin, choline, inositol and paraminobenzoic acid, carnitine, vitamin C, vitamin D and its analogs, vitamin A and the carotenoids, retinoic acid, vitamin E, vitamin K, vitamin $B_6$, vitamin $B_{12}$, and combinations thereof. Combinations comprising at least one of the foregoing nutraceuticals can be used.

Specific optional, additional medicaments that can be used include caffeine, cimetidine, ranitidine, famotidine, omeprazole, dyclonine, nicotine, and combinations thereof.

The medicaments can be present in a suitable amount depending upon the suitable level of dosage for the desired purpose. In some embodiments, the medicaments are present in an amount of about 0.01 to about 2 weight percent of the chewing gum composition. Within the range of about 0.01 to about 2 weight percent, the medicaments can be about 0.05 to about 1.25 weight percent; specifically, the medicaments can be about 0.1 to about 1 weight percent.

Anti-oxidants include natural and artificial anti-oxidants like beta-carotenes, acidulants e.g. Vitamin C, propylgallate, butyl hydroxyanisole, butylated hydroxytoluene, Vitamin E, Carnosic acid, Rosmanol, rosmaridiphenol, and the likes. The anti-oxidants can be present in a suitable amount depending upon the desired purpose. In some embodiments, the anti-oxidants are present in an amount of about 0.01 to about 2 weight percent of the chewing gum composition. Within the range of about 0.01 to about 2 weight percent, the anti-oxidants can be about 0.05 to about 1.25 weight percent; specifically, the anti-oxidants can be about 0.1 to about 1 weight percent.

Preservatives include any natural and synthetic preservatives that improve shelf life of a chewing gum product. Suitable preservatives include propanoic acid, benzoic acid, and sorbic acid.

The relative amounts of each of the components of the chewing gum composition will depend on the identity of the particular component of the chewing gum composition, as well as, the desired flavor of the chewing gum composition, and are readily determined by one of ordinary skill in the art.

The chewing gum compositions of the disclosed herein can be coated or uncoated, and be in the form of slabs, sticks, pellets, balls, and the like. The composition of the different forms of the gum compositions will be similar but can vary with regard to the ratio of the ingredients. For example, coated gum compositions can contain a lower percentage of softeners. Pellets and balls can have a chewing gum core, which has been coated with either a sugar solution or a sugarless solution to create the hard shell. Slabs and sticks are usually formulated to be softer in texture than the chewing gum core. In some cases, a hydroxy fatty acid salt or other surfactant active can have a softening effect on the gum base. In order to adjust for any potential undesirable softening effect that the surfactant active can have on the gum base, it can be beneficial to formulate a slab or stick gum having a firmer texture than usual (i.e., use less conventional softener than is typically employed).

Center-filled gum is another common gum form. The gum portion has a similar composition and mode of manufacture to that described above. However, the center-fill is typically an aqueous liquid or gel, which is injected into the center of the gum during processing. The center-filled gum can also be optionally coated and can be prepared in various forms, such as in the form of a lollipop.

In some embodiments, there is provided a method of preparing a photo-degradable chewing gum comprising blending an elastomer, a block copolymer of vinyl acetate and methylphenyl silane having a structure of formula (I) described above, and at least one sweetener.

In some other embodiments, the method includes pre-blending the elastomer and the block copolymer to prepare a pre-blend, and blending the pre-blend with at least one sweetener.

The photo-degradable chewing gum compositions can be prepared using standard techniques and equipments known to those skilled in the art. The apparatus useful in accordance with some embodiments comprises mixing and heating apparatus well known in the chewing gum manufacturing arts, and therefore the selection of the specific apparatus will be apparent to the artisan.

In some embodiments, gum pieces can be coated with an aqueous coating composition, which can be applied by any method known in the art. The coating composition can be present in an amount of about 10 to about 50 weight percent of the total gum piece. Within the rage of about 10 to about 50 weight percent, the coating composition amount can be about 20 to about 40 weight percent, specifically about 25 to about 35 weight percent.

The outer coating can be hard or crunchy. In some embodiments, the outer coating includes sorbitol, maltitol, xylitol, isomalt, or another crystallizable polyol. Sucrose can also be used. Flavorants can also be added to yield unique product characteristics. The coating, if present, can include several opaque layers, such that the chewing gum composition is not visible through the coating itself, which can optionally be covered with a further one or more transparent layers for aesthetic, textural and protective purposes. The outer coating can also contain small amounts of water and gum arabic. The coating can be further coated with wax. The coating can be applied by successive applications of a coating solution, with drying in between each coat. As the coating dries it usually becomes opaque and is usually white, though other colorants can be added. A polyol coating can be further coated with wax. The coating can further include colored flakes or speckles.

The coating can be formulated to assist with increasing the thermal stability of the gum piece and preventing leaking of a liquid fill if the gum product is a center-filled gum. In some embodiments, the coating can include a gelatin composition. The gelatin composition can be added as a 40 weight percent aqueous solution and can be present in the coating composition about 5 to about 10 weight percent of the coating composition, and more specifically about 7 to about 8 weight percent of the coating solution. The gel strength of the gelatin can be about 130 bloom to about 250 bloom.

The foregoing and other embodiments are further illustrated by the following examples, which are not intended to limit the effective scope of the claims. All parts and percentages in the examples and throughout the specification and claims are by weight of the final composition unless otherwise specified.

EXAMPLE 1 AND COMPARISION 1

Example 1 is a photodegradable chewing gum containing the block copolymer of vinyl acetate and methylphenyl silane. Comparison 1 chewing gum does not contain the block copolymer.

(A) Preparation of Poly(Vinyl Acetate-Block-Methylphynyl Silane)

To prepare the block copolymer, 5 grams of polymethylphenyl silane having a weight average molecular weight of 32,600 and polydispersity index of 3.0 was added to a clean dry Schlenk tube. 15 milliliters of xylene and 95 grams of methyl methacrylate were added to the tube. Oxygen was removed through six freeze-thaw cycles whilst purging with dry nitrogen gas. The mixture was then warmed to 95° C. and irradiated with ultraviolet (UV) light of 200-350 nm for about 10 minutes to begin polymerization. The mixture was held at 95° C. for a further 120 minutes and further irradiated for 10 minutes with UV light of 200-350 nanometers. The mixture was maintained at 95° C. for another 120 minutes. The solution was then exposed to a source of oxygen to stop the reaction. The copolymer product was obtained via precipitation by cold methanol. The polymer product was washed with further cold methanol and water. Gel permeation chromatography analysis confirmed formation of a copolymer with a weight average molecular weight of 150,000 with a polydispersity index of 3.5. Formation of block copolymer of vinyl acetate and methylphenylsilane was confirmed by H$^1$ NMR. The H$^1$ NMR results indicated that the block copolymer contained 1.2 weight percent of methylphenylsilane and 98.8 weight percent of polyvinyl acetate. The copolymer can have one of the many structures shown in FIG. 1. In FIG. 1, blocks of polyvinyl acetate are indicated by solid boxes 1 and blocks methylphenylsilane are indicated by —Si—Si— chains.

(B) Proposed Preparation of Example 1 and Comparison 1 Gum Bases

Gum bases of Example 1 and Comparison 1 are prepared according to compositions set forth in Table 1. To prepare the gum bases, first a master batch (masticated elastomer) is prepared as following:

Elastomers, viz. polyisobutylene, and butyl rubber are put in a standard mixer in proportions indicated in Table 1. The elastomers are heated to about 130° C. The heated elastomers are mixed for about 15 minutes. Hydrogenated cottonseed oil with a melting point of about 70° C. is then added gradually and mixed with the elastomers for about 90 minutes. Glycerol monostearate is then added to the mixer and mixed with the elastomer for about 20 minutes to homogenize the mixture. The master batch is thus prepared. Gum bases are then prepared from the master batch.

To prepare Example 1 gum base, block copolymer of vinyl acetate and methylphenyl silane is added in another standard mixer and heated to about 130° C. Master batch prepared according to the process described above is then added to the block copolymer and mixed for about 15 minutes. Hydrogenated cottonseed oil with a melting point of about 45° C. is then added to the mixer and mixed for about 10 minutes. Triacetin is then added and mixed for 10 minutes. Talc is then added and mixed for about 10 minutes.

To prepare Comparison 1 gum base, polyvinyl acetate is added in another standard mixer and heated to about 130° C. Master batch prepared according to the process described above is then added to the polyvinyl acetate and mixed for about 15 minutes. Hydrogenated cottonseed oil with a melting point of about 45° C. is then added to the mixer and mixed for about 10 minutes. Triacetin is then added and mixed for 10 minutes. Talc is then added and mixed for about 10 minutes.

TABLE 1

Compositions of Example 1 and Comparison 1 Gum Bases

| Component | Example 1 (weight percent) | Comparison 1 (weight percent) |
| --- | --- | --- |
| Polyvinylaceteate | 0 | 17 |
| Polyisobutylene | 15 | 15 |
| Poly(vinylacetate)-block-poly(methylphenylsilane) | 17 | 0 |
| Butyl Rubber | 5 | 5 |
| Hydrogenated Cottonseed Oil (melting point 70 degree Celsius) | 10 | 10 |
| Hydrogenated Cottonseed Oil (melting point 45 degree Celsius) | 13 | 13 |
| Triacetin | 7 | 7 |
| Glycerol Monostearate | 8 | 8 |
| Filler (Talc) | 25 | 25 |
| Total | 100 | 100 |

(C) Proposed Preparation of Example 1 and Comparison 1 Chewing Gums

Example 1 and Comparison 1 chewing gums are prepared according to the compositions listed in Table 2. To prepare the chewing gums, the corresponding gum bases are melted at a temperature of about 175° C. Once melted and placed in a standard mixer, additional ingredients i.e. sorbitol, mannitol, xylitol, acetylated monoglycerides, glycerin, coolant, encapsulated food-grade acids, lecithin, powdered and liquid flavors, acesulfame K, and aspartame are added, and thoroughly mixed for about 20 minutes.

TABLE 2

Compositions of Example 1 and Comparison 1 chewing gums

| Component | Example 1 (weight percent) | Comparison 1 (weight percent) |
| --- | --- | --- |
| Gum base of Table 1 | 28 | 28 |
| Lecithin | 0.5 | 0.5 |
| Acetylated monoglycerides, distilled | 0.5 | 0.5 |
| Sorbitol | 40 | 40 |
| Mannitol | 5 | 5 |
| Xylitol | 11 | 11 |
| Glycerin | 4.75 | 4.75 |
| Colorant | 0.04 | 0.04 |
| Liquid flavor | 3.1 | 3.1 |

TABLE 2-continued

Compositions of Example 1 and Comparison 1 chewing gums

| Component | Example 1 (weight percent) | Comparison 1 (weight percent) |
|---|---|---|
| Cooling compound | 0.06 | 0.06 |
| Powdered flavor | 1.5 | 1.5 |
| Citric Acid | 0.75 | 0.75 |
| Malic acid | 0.75 | 0.75 |
| Aspartame | 2.7 | 2.7 |
| Acesulfame potassium salt | 1.35 | 1.35 |
| Total | 100 | 100 |

EXAMPLE 3

Proposed Testing for Degradation Properties of Example 1 and Comparison 1

The experiment described below can be carried out to evaluate photo-degradation properties of the gum bases.

Individual pieces of chewing gum products of Example 1 and Comparison 1 are placed in an Erweka DRT-1 chewing gum machine between two nylon nets. The gap between the jaws was set to 2.5 mm. The pieces are then chewed mechanically at 40 strokes per minute for 30 minutes in 20 milliliters of de-ionized water to form cuds.

Chewed gum cuds of Example 1 and Comparison 1 are left on an outdoor concrete slab for 7 days. The outdoor concrete slab receives direct sunlight. The outdoor concrete slab simulates the environmental conditions. The chewing gum cuds can be visually and physically examined at the end of the seven day period to evaluate respective photo-degradation properties.

In an embodiment, a photo-degradable gum base composition comprises an elastomer; and a block copolymer of vinyl acetate and methylphenylsilane having a structure of formula (I)—

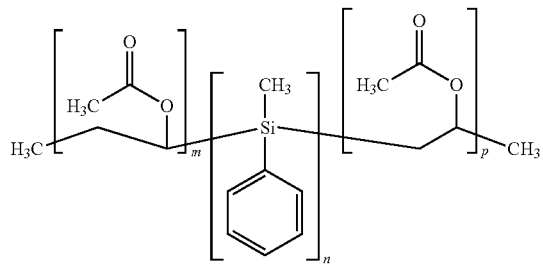

wherein m and p are integers in the range of 1 to 500, and n is an integer in the range of 2 to 100.

In various embodiments: (i) the photo-degradable gum base comprises about 5 to about 30 weight percent of the block copolymer, based on the total weight of the gum base; and/or (ii) the block copolymer comprises about 0.1 to about 10% by weight of the methylphenylsilane, based on the weight of the block copolymer, as measured according to proton nuclear magnetic resonance spectroscopy; and/or (iii) the block copolymer has a weight average molecular weight of about 50,000 to about 200,000 atomic mass units; and/or (iv) the elastomer is selected from the group consisting of polyisobutylene, butyl rubber, butadiene-styrene rubber and combinations thereof; and/or (v) the photodegradable gum base further comprises at least one additional component which promotes photo-degradation; and/or (vi) the additional component is selected from the group consisting of chlorophyll, and derivatives such as chlorophyllin, pheophytin, pyropheophytin and pheophorbide; and/or (vii) the photodegradable gum base further comprises at least one non-stick inducing component selected from the group consisting of hydrogenated cottonseed oil, hydrogenated soybean oil, hydrogenated canola oil, hydrogenated olive oil, hydrogenated grape seed oil, hydrogenated peanut oil, hydrogenated sunflower oil, hydrogenated safflower oil, hydrogenated palm oil, hydrogenated cocoa butter, hydrogenated coconut oil, hydrogenated palm kernel oil, animal fats, fatty esters of sugars and phospholipids, wherein said gum base exhibits increased degradability and/or reduced-stick properties in the presence of the non-stick inducing component as compared to in the absence of the non-stick inducing component; and/or (viii) the photodegradable gum base further comprises at least one water absorption-promoting component selected from the group consisting of a copolymer of methyl vinyl ether and maleic anhydride, an ether or ester of copolymer of methyl vinyl ether, and maleic anhydride, a terpolymer of methylvinyl ether, maleic anhydride and maleic acid, a copolymer of polystyrene and maleic anhydride, a polysuccinimide, an alternating copolymer of ethylene, and maleic anhydride, and combinations thereof; and/or (ix) the photodegradable gum base further comprises at least one hydrolysis-promoting component selected from the group consisting of talc, calcium carbonate, carbonate-containing fillers, dicalcium phosphate and combinations thereof.

In an embodiment, a degradable chewing gum composition comprises an elastomer; a block copolymer having a structure of formula (I)

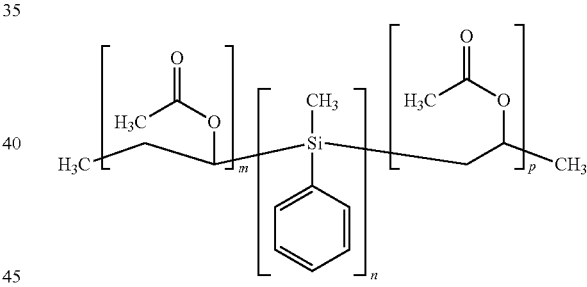

wherein m and p are integers in the range of 1 to 500, and n is an integer in the range of 2 to 100; and at least one sweetener.

In an embodiment, a method of preparing a photo-degradable chewing gum comprises blending an elastomer; a block copolymer of vinyl acetate and methylphenyl silane having a structure of formula (I)—

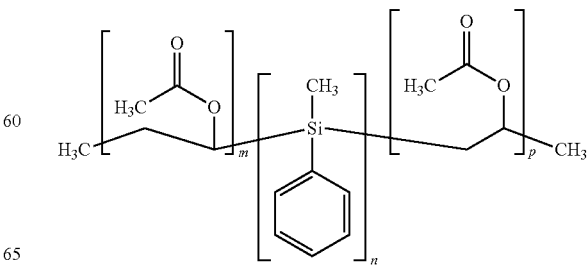

wherein m and p are integers in the range of 1 to 500, and n is an integer in the range of 2 to 100; and at least one sweetener. In another embodiment, said blending comprises pre-blending the elastomer with the block copolymer to an elastomer pre-blend, and blending the elastomer pre-blend and the at least one sweetener.

This written description uses examples to disclose the invention, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A photo-degradable chewing gum composition comprising
   at least one sweetener; and
   a gum base, wherein the gum base comprises an elastomer and
   a block copolymer having a structure of formula (I)

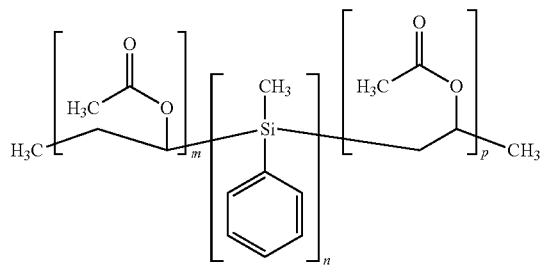

(I)

wherein m and p are integers in the range of 1 to 500, and n is an integer in the range of 2 to 100.

2. The composition of claim 1, wherein the gum base comprises about 5 to about 30 weight percent of the block copolymer, based on the total weight of the gum base.

3. The composition of claim 1, wherein the block copolymer comprises about 0.1 to about 10% by weight of the methylphenylsilane, based on the weight of the block copolymer, as measured according to proton nuclear magnetic resonance spectroscopy.

4. The composition of claim 1, wherein the block copolymer has a weight average molecular weight of about 50,000 to about 200,000 atomic mass units.

5. The composition of claim 1, wherein the elastomer is selected from the group consisting of polyisobutylene, butyl rubber, butadiene-styrene rubber and combinations thereof.

6. The composition of claim 1, wherein the gum base further comprises at least one additional component which promotes photo-degradation.

7. The composition of claim 6, wherein the additional component is selected from the group consisting of chlorophyll, and derivatives such as chlorophyllin, pheophytin, pyropheophytin and pheophorbide.

8. The composition of claim 1, wherein the gum base further comprises at least one non-stick inducing component selected from the group consisting of hydrogenated cottonseed oil, hydrogenated soybean oil, hydrogenated canola oil, hydrogenated olive oil, hydrogenated grape seed oil, hydrogenated peanut oil, hydrogenated sunflower oil, hydrogenated safflower oil, hydrogenated palm oil, hydrogenated cocoa butter, hydrogenated coconut oil, hydrogenated palm kernel oil, animal fats, fatty esters of sugars and phospholipids, wherein said gum base exhibits increased degradability and/or reduced-stick properties in the presence of the non-stick inducing component as compared to in the absence of the non-stick inducing component.

9. The composition of claim 1, wherein the gum base further comprises at least one water absorption-promoting component selected from the group consisting of a copolymer of methyl vinyl ether and maleic anhydride, an ether or ester of a copolymer of methyl vinyl ether, and maleic anhydride, a terpolymer of methylvinyl ether maleic anhydride and maleic acid, a copolymer of polystyrene and maleic anhydride, a polysuccinimide, an alternating copolymer of ethylene and maleic anhydride, and combinations thereof.

10. The composition of claim 1, wherein the gum base further comprises at least one hydrolysis-promoting component selected from the group consisting of talc, calcium carbonate, carbonate-containing fillers, dicalcium phosphate and combinations thereof.

11. A method of preparing a photo-degradable chewing gum comprising
    blending
    an elastomer;
    a block copolymer of vinyl acetate and methylphenyl silane having a structure of formula (I)

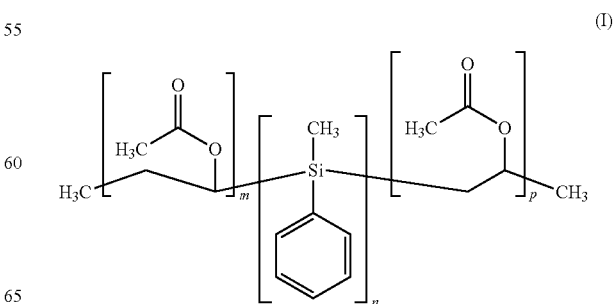

(I)

wherein m and p are integers in the range of 1 to 500, and n is an integer in the range of 2 to 100; and
at least one sweetener.

12. The method of claim 11, wherein said blending comprises pre-blending the elastomer with the block copolymer to an elastomer pre-blend, and blending the elastomer pre-blend and the at least one sweetener.

* * * * *